United States Patent
Dementhon et al.

(10) Patent No.: US 10,502,367 B2
(45) Date of Patent: Dec. 10, 2019

(54) GAS STORAGE UNIT AND ASSOCIATED STRUCTURE AND SYSTEM

(71) Applicant: AAQIUS & AAQIUS SA, Geneva (CH)

(72) Inventors: Jean-Baptiste Dementhon, Paris (FR); Michael Francis Levy, Paris (FR)

(73) Assignee: AAQIUS & AAQIUS SA, Geneva (CH)

( * ) Notice: Subject to any disclaimer, the term of this patent is extended or adjusted under 35 U.S.C. 154(b) by 156 days.

(21) Appl. No.: 14/419,649

(22) PCT Filed: Aug. 9, 2013

(86) PCT No.: PCT/EP2013/066770
§ 371 (c)(1),
(2) Date: Feb. 4, 2015

(87) PCT Pub. No.: WO2014/023841
PCT Pub. Date: Feb. 13, 2014

(65) Prior Publication Data
US 2015/0211683 A1     Jul. 30, 2015

(30) Foreign Application Priority Data

Aug. 9, 2012   (EP) .................................... 12305993
Dec. 31, 2012  (EP) .................................... 12306714

(51) Int. Cl.
*F01N 3/18*       (2006.01)
*F17C 11/00*      (2006.01)
(Continued)

(52) U.S. Cl.
CPC .............. *F17C 11/00* (2013.01); *F01N 3/206* (2013.01); *F01N 3/2066* (2013.01); *F01N 13/16* (2013.01);
(Continued)

(58) Field of Classification Search
CPC .. F01N 3/208; F01N 2610/02; F01N 2610/06; F01N 2610/1413; F01N 2610/1453
(Continued)

(56) References Cited

U.S. PATENT DOCUMENTS

| 4,134,491 A |   | 1/1979 | Turillon et al. |
| 4,598,836 A | * | 7/1986 | Wessel .................. C01B 3/0005 |
|             |   |        | 206/0.7 |

(Continued)

FOREIGN PATENT DOCUMENTS

| DE | 10 2008 002 338 A1 | 12/2009 |              |
| DE | WO 2009149982 A2 * | 12/2009 | ................ B01J 7/00 |

(Continued)

OTHER PUBLICATIONS

Han, J. H., et al., "Gas Permeability of Expanded Graphite-Metallic Salt Composite," *Applied Thermal Engineering*, vol. 21, No. 4, Mar. 1, 2001, XP002620755, pp. 453-463.
(Continued)

*Primary Examiner* — Jorge L Leon, Jr.
(74) *Attorney, Agent, or Firm* — Womble Bond Dickinson (US) LLP (57) ABSTRACT

Unit for storing gas by absorption or adsorption, comprising a chamber containing a storage element (702, 704) that stores gas by absorption or adsorption, characterized in that it further comprises a compressible element (712) also provided within the chamber and kept in contact with the storage element (702, 704) and designed to deform under the action of loads applied by the storage element (702, 704) upon variations in volume of the storage element (702, 704) during phases of storing gas and releasing gas from storage, so as to limit the loads applied to the chamber.

34 Claims, 6 Drawing Sheets

(51) Int. Cl.
  *F01N 3/20* (2006.01)
  *F01N 13/16* (2010.01)
  *F17C 13/00* (2006.01)

(52) U.S. Cl.
  CPC ............ *F17C 13/004* (2013.01); *F01N 3/208* (2013.01); *F01N 2610/02* (2013.01); *F01N 2610/06* (2013.01); *F01N 2610/1406* (2013.01); *F01N 2610/1413* (2013.01); *F01N 2610/1453* (2013.01); *Y02T 10/24* (2013.01)

(58) Field of Classification Search
  USPC .................................. 60/274, 286, 295, 301
  See application file for complete search history.

(56) References Cited

U.S. PATENT DOCUMENTS

| | | | | |
|---|---|---|---|---|
| 2009/0280047 | A1* | 11/2009 | Christensen | B01D 53/90 423/239.1 |
| 2010/0021780 | A1* | 1/2010 | Johannessen | B01D 53/8631 429/421 |
| 2011/0073806 | A1* | 3/2011 | Svagin | B01J 20/046 252/193 |
| 2011/0218095 | A1* | 9/2011 | Quaade | B01D 53/9481 502/1 |
| 2011/0280768 | A1* | 11/2011 | Kawasaki | B01D 53/90 422/111 |
| 2013/0327021 | A1 | 12/2013 | Greber | |
| 2014/0271389 | A1* | 9/2014 | Yezerets | B01D 53/90 422/173 |

FOREIGN PATENT DOCUMENTS

| | | |
|---|---|---|
| EP | 1 977 817 A1 | 10/2008 |
| EP | 2 386 523 A1 | 11/2011 |
| EP | 2 428 490 A1 | 3/2012 |
| JP | A-1992504224 | 7/1992 |
| JP | 06-158194 | 6/1994 |
| WO | WO 9010491 A1 | 9/1990 |
| WO | WO 2010/025948 A1 | 3/2010 |
| WO | WO 2011/038916 A1 | 4/2011 |
| WO | WO 2011/119735 A1 | 9/2011 |
| WO | WO 2012/001331 A1 | 1/2012 |

OTHER PUBLICATIONS

Office Action in Japanese Application No. 2015-525909 dated Jul. 18, 2017, with English translation.

* cited by examiner

GAS STORAGE UNIT AND ASSOCIATED STRUCTURE AND SYSTEM

FIELD OF THE INVENTION

The invention generally relates to the storage of ammonia or other gas in applications for reducing nitrogen oxides $NO_x$ by selective catalytic reduction (SCR), notably for reducing emissions of pollutants by internal combustion engines, in particular diesel engines.

STATE OF THE ART

The emissions of pollutants related to transport have been for about 30 years a first rate engine for progress in industry. The gradual increase in the severity of emission limits for the four regulated pollutants (CO, HC, $NO_x$, particles) has given the possibility of significantly increasing the quality of air notably in large cities.

The still increasing use of automobiles requires pursuance of efforts for further reducing more these emissions of pollutants. A reduction in the tolerance towards European emission thresholds is expected in 2014 within the framework of steps for the entering into effect of the Euro6 standard. Such steps aim at reducing local pollution. Having high efficiency depollution technologies in all driving conditions is thus a major challenge for the transport industry. Within this context, reduction of nitrogen oxides ($NO_x$) in a lean mixture, i.e. in a mixture including excess oxygen, represents a significant challenge associated with complex problems.

Moreover, fuel consumption, in a direct relationship with emissions of $CO_2$, has been propelled within a few years to the rank of a major concern of automobiles. Thus, a regulation was set into place on the European level from 2012 on the $CO_2$ emissions of private vehicles. It is now already required that this limit will be regularly lowered during future decades. Reduction of $CO_2$ emissions is therefore imposed as the new growth engine for all the transport industry.

This double problem; reduction in local pollution ($NO_x$) and reduction in fuel consumption ($CO_2$), is particularly difficult for diesel engines, for which combustion of a lean mixture is accompanied by $NO_x$ emissions which are difficult to treat.

In this context, the SCR (selective catalytic reduction) post-treatment technology is used both for private vehicles and for vehicles assigned to transportation of goods. It is then possible to position the engine on its optimum yield operation, the strong $NO_x$ emissions then being treated in the exhaust system with the SCR system allowing $NO_x$ reduction with strong efficiency.

In order to allow the setting into place of such an SCR technology, it is necessary to load on-board the vehicle a reducing agent required for reducing nitrogen oxides. The system preferably retained by heavy trucks uses urea in an aqueous solution as a reducing agent. Injected into the exhaust, urea is broken down by the effect of the temperature of the exhaust gases into ammonia ($NH_3$) and allows reduction of $NO_x$ on a specific catalyst. An aqueous solution of urea retained and standardized for operating the SCR systems presently in series is referenced as AUS32 (the trade name in Europe being Adblue®).

This highly efficient method, however, suffers from a certain number of drawbacks. It has limited efficiency in the cold, while such a situation appears in many cases, notably that of buses in cities. The urea tank has a significant mass and volume, typically from 15 to 30 L for a private vehicle, 40 to 80 L for a heavy truck. Such a size causes complexity of integration into the vehicle, all the more significant since the vehicle is small. The result of this is a high depollution cost, as well as a mass excess which is made to the detriment of the fuel consumption of the vehicle and therefore of the $CO_2$ emissions.

Various alternative storage methods have been contemplated. The option of storing ammonia in a pressurized gas form has many drawbacks in terms of compactness and of operation safety.

A preferred method consists in absorption of the gas inside a material, for example a salt, positioned in a storage container. Ammonia storage is then achieved within the salt by forming a chemical complex of the ammoniacate type. The advantages of this type of storage as compared with urea in an aqueous solution are numerous. Storage within a salt allows significant reduction in mass and volume of the storage tank. It also allows a benefit in terms of $CO_2$ balance because of the mass reduction of the reducing agent to be loaded on board for given ammonia autonomy. Indeed, the amount of additional water provided for diluting the urea in the conventional configuration of so-called liquid SCR is saved. Moreover, this type of storage gives the possibility of applying cold absorption of $NO_x$ with higher efficiency. This type of storage further ensures reduction in the manufacturing costs since the system for supplying and injecting ammonia may be simplified.

In order to limit the size of the storage container, automobile manufacturers prefer filling or replacement of the storage container, for example during engine maintenance, at the moment of the emptying, or during a filling of the fuel tank. The amount of ammonia loaded on board a private vehicle will be of the order of 6 kg for an equivalent of 16 L of a urea solution of the AUS32 type, which gives the possibility of ensuring autonomy of the private vehicle between two oil-change intervals of the vehicle. In order to allow supply of the system with ammonia, an electric heating element or via a heat transfer fluid for example is provided, controlled so as to meter in each condition of use the ammonia intended for treating nitrogen oxides.

Once the storage container, for example a cartridge, is empty, it is replaced with a full one, for example during vehicle maintenance, the empty one being sent back to a filling centre. A cartridge may thus be subject to 10 to 15 emptying/filling cycles.

Indeed, during the absorption reaction, the binding of the ammonia gas by the solid salt making up the storage material is accompanied by an increase in volume, the ammoniacate then occupying a volume much larger than the volume of pure salt. The volume of the salt after absorption may be up to four to five times greater than the volume of the salt without any ammonia. The increase in volume of the salt is not only due to expansion of the crystalline lattice of the material but also to its fractionation thus leaving free space between the microcrystals of ammoniacate complex. The successive phases of expansion, contraction of the porous matrix may thus locally cause sintering phenomena which have a negative effect on the homogeneity of the porosity and generally on the durability of the material.

SUMMARY OF THE INVENTION

A goal of the invention is to propose a storage unit, and a structure and an associated system, which remedy all or part of the aforementioned drawbacks.

Goals of the invention are in particular to limit the mechanical expansion forces exerted on the walls of a storage container, and to preserve the integrity of the storage structure, during absorption/desorption cycles.

For this purpose, a gas storage unit by absorption or adsorption is proposed, including a container harboring an element for storing gas by absorption or adsorption, further including a compressible element also provided in the container and maintained in contact with the storage element and adapted in order to deform under the action of forces exerted by the storage element during volume variations of the storage element during phases for storing and discharging gas, so as to limit the forces applied onto the container.

The invention is advantageously completed with the following features, taken alone or according to any of their technically possible combinations:
- the storage element is in a powdery form, either compressed or non-compressed;
- the compressible element consists of a porous medium;
- the compressible element includes a porous matrix of expansed natural graphite;
- the expansed natural graphite is pre-compressed before being set into place into the container;
- an alternation of layers is provided including one layer of a storage element and at least one layer of a compressible element;
- a series of storage elements separated two by two by compressible elements is provided;
- a first combination is provided of a storage element, integrated into a compressible element so as to be surrounded by the compressible element;
- a second combination is provided of a compressible element integrated into a storage element so as to be surrounded by the storage element;
- an alternation of first combination(s) and of second combination(s) is provided;
- a series of storage elements integrated into a common compressible element is provided;
- the compressible element includes two portions, at least one portion being held so as to bear against a storage element, both portions being interconnected through an elastic mechanical element;
- the elastic mechanical element includes a spring;
- the compressible element is adapted so as to deform with variation of density under the action of forces exerted by the storage element during volume variations of the storage element during phases for storing and discharging gas, so as to limit the forces applied on the container.

The invention also proposes a structure for storing gas by absorption or adsorption, suitable so as to be positioned in a container, the structure including a gas storage element by absorption or adsorption, further including a compressible element maintained in contact with the storage element and adapted so as to deform under the action of forces exerted by the storage element during volume variations of the storage element during phases for storing and discharging gas.

The invention also proposes a selective catalytic reduction system for exhaust gases of an internal combustion engine, including an ammonia storage unit as described earlier, and a module for injecting ammonia into the exhaust gases.

The invention also proposes a method for filling a gas storage unit including a container intended to harbor at least one gas storage element by absorption or adsorption, including the following steps:
- placing in said container at least one gas storage element, essentially without any gas,
- placing in said container, adjacent to the storage element, at least one compressible element,
- closing the container and applying to the latter a source of pressurized gas, in order to store the gas by adsorption in said or each gas storage element, said or each compressible element being adapted so as to deform under the action of forces exerted on it because of the volume variations of said or each storage element during this storage, in order to limit the forces applied on the container.

The invention is advantageously completed with the following feature:

The storage element is a layer of powdery salt, the method including the introduction of the powdery salt into the container in order to form a layer and a shaping of this layer with a plunger.

The invention also relates to a method for obtaining an ammonia storage structure as described earlier, the method including steps consisting of:
- depositing a storage layer including a non-compressed salt or compressed beforehand,
- depositing a layer of a compressible element,
- both of these steps being repeated in order to form a structure including an alternation of storage layers and intercalary layer(s) of compressible material,
- wherein the storage layer and the compressible element layer are pre-assembled, both layers being then deposited simultaneously in the container.

The invention is advantageously completed by the following feature:
- the pre-assembly is carried out by adhesively bonding and/or compressing the layers against each other.

SHORT DESCRIPTION OF THE FIGURES

Other features, objects and advantages of the invention will become apparent upon the description hereafter of an embodiment. In the appended drawings.

DETAILED DESCRIPTION OF THE INVENTION

1) Known Properties of Ammonia Chemisorption in Salts a) Reaction

In a storage structure, a powdery salt is selected from earth-alkaline chlorides. In particular, the powdery salt is selected from the following compounds: $SrCl_2$, $MgCl_2$, $BaCl_2$, $CaCl_2$, $NaCl_2$. The ammonia storage is moreover based on a reversible solid-gas reaction of the type:

<Solid A>+(Gas)⇌<Solid B>

Ammonia forms with earth-alkaline chlorides coordination complexes also called ammoniacates. This phenomenon is known to one skilled in the art.

For example, the reactions of ammonia with strontium chloride are:

$SrCl_2$ (s)+$NH_3$ (g)⇌$Sr(NH_3)Cl_2$ (s)

$Sr(NH_3)Cl_2$ (s)+7$NH_3$ (g)⇌$Sr(NH_3)_8Cl_2$ (s)

Also, the unique reaction of ammonia with barium chloride is:

$BaCl_2$ (s)+8$NH_3$ (g)⇌$Ba(NH_3)_8Cl_2$ (s)

The chemical absorption of the ammonia ligand by the absorbent $SrCl_2$ and $BaCl_2$ causes, between the solid and the gas a transfer of electrons which is expressed by chemical bonds between $NH_3$ and the outer layer of the $SrCl_2$ and $BaCl_2$ atoms. Penetration of the gas into the structure of the solid being accomplished in the totality of its mass by a diffusion process. This reaction is perfectly reversible, absorption being exothermic and desorption endothermic.

b) Expansion

Figure 2A:
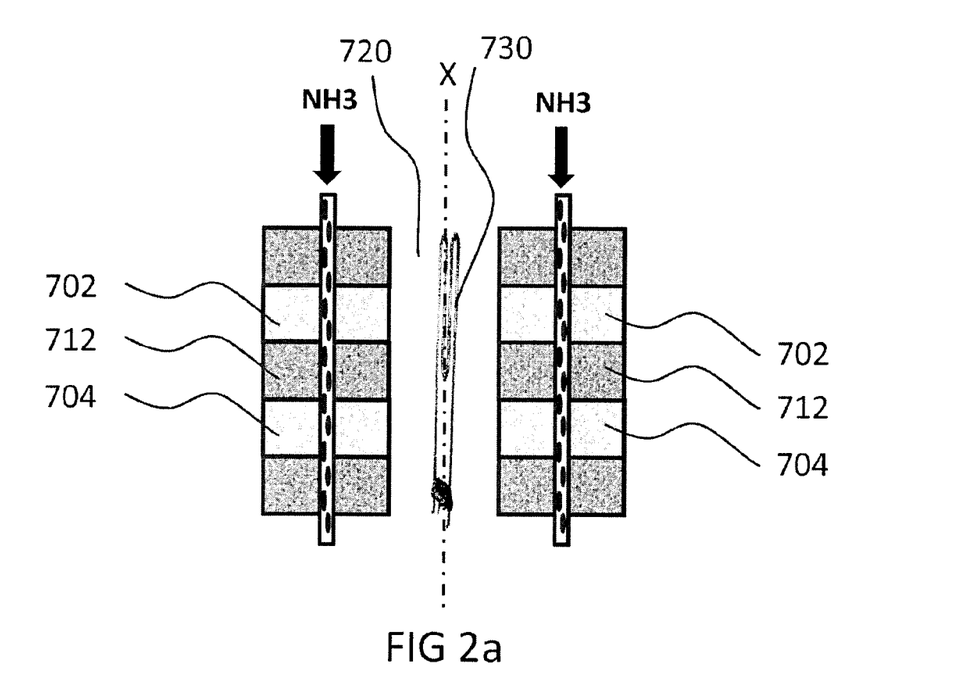
FIG. 2a illustrates a storage matrix consisting of several storage elements inserted with several expansion absorption compressible elements, the storage matrix being free of ammonia.
Figure 2B:
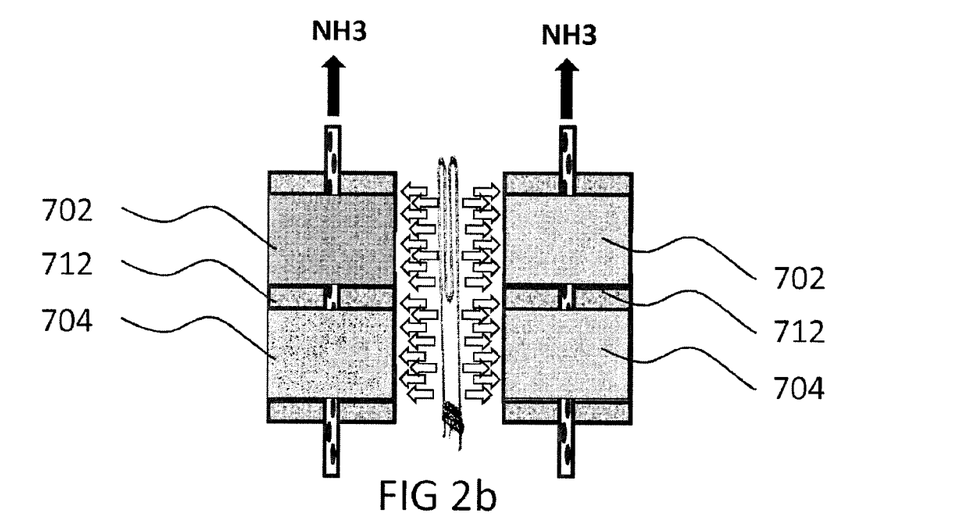
FIG. 2b illustrates the storage matrix of FIG. 2a after filling with ammonia.

With reference to FIGS. 2a to 2d, the resulting expansion from the absorption phenomenon in the case of the magnesium chloride salt is described. FIG. 2a illustrates the crystalline structure of a $MgCl_2$ salt layer. FIG. 2b illustrates an ammonia molecule.

The reactions of the ammonia with magnesium chloride are of the form:

$MgCl_2$ (s)+$nNH_3$ (g)⇌$MgCl_2(NH_3)_n$ (s)

wherein n may have the value 2 or 6. Thus FIG. 2c illustrates the crystalline structure of $MgCl_2(NH_3)_2$ and FIG. 2d the crystalline structure of $MgCl_2(NH_3)_6$ With reference to table 1, the theoretical expansion factor between different pure salts and their associated pure complexes is indicated. This value only corresponds to the expansion of the crystalline lattice, does not integrate expansion due to the fractionation between the microcrystals. The absorption enthalpy values are given at equilibrium with low vapor pressure.

TABLE 1

| Molecular formula | Molecular mass (g/mol) | Density (kg/L) | Expansion factor | Absorption enthalpy (kJ/mol) | Absorption entropy (J/mol · K) |
|---|---|---|---|---|---|
| $(NH_2)_2CO^+H_2O$ | N/A | 1.086 | | 0.184 | 0.2 |
| $MgCl_2$ | 95.21 | 2.32 | | | |
| $Mg(NH_3)_6Cl_2$ | 197.39 | 1.16 | 2 | 55.7 | 230 |
| $SrCl_2$ | 158.53 | 3.05 | | | |
| $Sr(NH_3)_8Cl_2$ | 294.77 | 1.3 | 2.35 | 38.7 | 230 |
| $BaCl_2$ | 208.23 | 3.85 | | | |
| $Ba(NH_3)_8Cl_2$ | 344.37 | 1.7 | 2.26 | 41.4 | 230 |
| $NH_3$ | 17.03 | 0.61 | | | | c) Conditions on the Storage Structure

An ammonia storage structure should be able to ensure several filling/emptying cycles during the life of the carrier with which it is associated. These emptying/filling cycles give rise to ammonia phase changes. Emptying will be caused by a rise in temperature of the structure; filling, as for it, is ensured after connecting a container 8 to a pressurized ammonia supply circuit 200 and via a device for cooling the assembly, intended to remove the evolved calories during the phase change of the ammonia.

In the case of absorption of the gas in a powdery salt, the gas diffuses through the porous medium of the storage structure salt, from the salt grain to the outlet of the container, for example a cartridge, allowing ammonia to be available for injecting into the exhaust.

During the phase for conditioning and reconditioning the container, ammonia is reintroduced into the system, diffuses within the porous medium generated by the powdery salt and is absorbed within the salt grains. The cycle of these transformations over time, or breathing of the material, should be able to be accomplished without any deterioration of the storage capacity and with reasonable times. Heterogeneous compression gradients in the salt and sintering mechanisms may actually deteriorate the storage structure.

d) Additives

The addition of a powder additive to a salt is sometimes described for improving heat conductivity and making the storage structure more robust, i.e. more able to be filled. The addition of various additives was contemplated in the state of the art.

The additive may include expansed natural graphite which may thus be added to the salt before it is shaped.

The additive may include a metal powder, for example aluminium powder.

e) Applying a Gas Desorption System from the Storage Matrix

The in fine production of a system using a gas storage matrix, for example with ammonia, involves the integration of the matrix and of its ammonia supply inside a storage container. The state of the art as regards use of solid storage of ammonia for $DeNO_x$ depollution, consists of integrating the ammonia by a fluidized bed to the storage material, the storage material being for example a salt, and then of compressing said material in the form of preformed wafers ready to be stacked inside the storage container.

It is then possible to integrate a device for heating the assembly, for example an electric resistor, for example as a heating blanket surrounding the storage container, said heating device being actuated according to a set value when gas pressure is required. In the case of such a system applied to solid SCR (selective catalytic reduction) $DeNO_x$, the heating is activated according to an algorithm stored in a computer which ensures the control of it, for example the engine ECU (Electronic Control Unit), so that the system generates an ammonia gas flow in a stoichiometric amount relative to the amount of $NO_x$ generated at the exhaust.

During the phases for using a vehicle equipped with such a system, the system will be gradually emptied of the stored ammonia depending on the $NO_x$ emissions of the vehicle. Once it is empty, the system will have to be reloaded with ammonia, for example on occurrence of a maintenance operation. Due to constraints on the size of the storage container, this emptying/filling cycle will generally be caused to occur several times during the life of a same vehicle.

In practice, the state of the art reports that the storage matrix may be dimensioned so as to be able, once it is saturated, to contain the amount of ammonia required for treating the total nitrogen oxides emitted between two oil change intervals of the vehicle (20,000 km to 30,000 km depending on the manufacturers). If a lifetime of 250,000 km is recognized for the vehicle, it appears that the average number of emptying(s)/filling(s) of the system is close to ten.

A concern of minimum size of the system encourages maximization of the compression of the storage matrix which minimizes the empty volume in its inside. Densities, measuring the ratio between the ammonia mass and the volume occupied by the storage matrix, included between 0.4 and 0.5 are often mentioned.

The higher the obtained density, the smaller will be the bulk volume, whence greater facility for integration onto the vehicle, but the increase in the density is also accompanied by several problems:

greater difficulty for desorbing ammonia (greater consumed electric power, time for maintaining a given gas flow rate being limited by the diffusion time of the gas from the inside of the storage matrix to the outlet of the storage container);

greater difficulty for filling the storage container (the compression of the material makes diffusion of the ammonia more difficult from the free spaces within the porous matrix), which makes the periodical maintenance operation of the system (for example the filling) longer and therefore more complex and expensive;

moreover, the higher the compression of the storage matrix inside the storage container, the greater the stress exerted by the material loaded on the walls of the storage container, which has repercussions on the material used and on its thickness and therefore on its mass;

such an application by compressing a storage material saturated with ammonia beforehand, may lead to lack of sustainability during successive adsorption/desorption cycles because of attrition or agglomeration of the storing material.

The object of the present invention is to overcome these various difficulties, by carrying out the filling with ammonia later on, with a storage unit and a structure for storing gas by absorption or adsorption inside a solid storage element not or weakly compressed, the storage element being adjacent to a compressible element, so called damper element, suitable for absorbing the increase in volume related to the absorption of the gas, for example of ammonia, by a variation of its own volume.

In this respect, document EP 2 522 823 describes a device for measuring the amount of ammonia in which a plate is stressed by the variations in the volume of the storage material (which depends on the instantaneous amount of ammonia in the material) and in turn stresses a piezoelectric sensor, in order to determine the available amount of ammonia. However, in this configuration no damping element which may have its own volume vary exists in this configuration and therefore no corresponding damping function is achieved.

Typically, the compressible element is adapted so as to elastically deform. It is thus possible for it to resume its shape subsequent to successive ammonia loading and unloading operations.

In an embodiment, the compressible element is adapted so as to deform by variation of density.

By absorption of the gas, is for example meant that the gas molecules are inserted into the inside of the crystal specific to the storage element. By adsorption is for example meant that the gas molecules form surface bonds of the Van der Waals type with the storage element. The compressible element is in contact with the storage element and is adapted so as to deform under the action of forces exerted by the storage element during volume variations of the storage element during phases for storing and discharging gas, so as to limit the forces applied on a container surrounding the structure.

The compressible element is for example adapted so as to deform elastically. The compressible element may be adapted so as to deform partly elastically.

Association of both of these elements at least allows the structure to breathe, to minimize the periods for releasing ammonia and filling it therewith, for providing greater flexibility in the selection of the materials and in design of the storage container, for increasing the number of possible emptying/filling cycles by preserving the durability of the assembly, generally by providing very great flexibility in the design of the system relative to the encountered application constraints.

The storage element allows storage by absorption or by adsorption.

By storage structure is meant an assembly including a storage material, the assembly being adapted so as to be placed in a storage container.

2) Structure Illustrating an Embodiment of the Invention

The storage structure described hereafter gives the possibility of avoiding the difficulties related to storage in a structure uniquely consisting of salt, in the form of compressed wafers after saturation with ammonia and before integration into a storage container in order to form a storage unit.

Such an ammonia storage structure includes at least one storage element, for example at least one layer, for example at least two layers, each forming a storage element, each layer for example including a salt, for example a powdery salt, in a compressed or non-compressed form, adapted for storing and discharging ammonia, the salt may either be compressed or not beforehand.

Both storage layers are at least for example separated from each other by at least one compressible element. This alternation of storage elements and of compressible elements gives the possibility of limiting for each of the storage layers the forces applied to the container.

Further, it is thus possible to obtain a globally balanced structure since the compressible elements are not isolated from the portion of the structure forming the storage element. This structure thus behaves globally as a storage structure and not as two distinct structures.

Both salt layers are at least for example separated from each other by at least one compressible element, for example having a damping effect, allowing absorption of expansions and retractions of the storage elements, which depend on the amount of ammonia stored in the structure.

The storage element and the compressible element are here shown as an indicative example as layers. Other forms of elements may, however, be contemplated by one skilled in the art.

The storage element for example includes a storage material selected from a salt complex of an amine metal of formula $Ma(NH_3)_nX_z$, wherein:

M is at least one cation selected from alkaline metals such as Li, Na, K or Cs, earth-alkaline metals such as Mg, Ca, Sr, or Ba, and/or transition metals such as V, Cr, Mn, Fe, Co, Ni, Cu, or Zn or a combination of the previous elements, such as NaAl, KAl, $K_2Zn$, CsCu, or $K_2Fe$, X is one anion from several anions selected from fluoride, chloride, bromide, iodide, nitrate, thiocyanate, sulfate, molybdate and phosphate ions;

a is a number of cations per salt molecule, and n is a coordination number included between 2 and 12, preferably included between 6 and 8.

The salt, for example powdery, may be selected from earth-alkaline chlorides. In particular, the salt may include or consist of the following compounds: $SrCl_2$, $MgCl_2$, $BaCl_2$, $CaCl_2$, $NaCl_2$. Each salt layer forming the storage element may preferentially include salt grains for which the grain size is included between 1 and 1,000 μm. Preferentially, the mass of compressible material may represent between 1% and 30% of the mass of salt.

Each salt layer forming a storage element may have the density of the powder of the same salt without any compression. Each salt layer forming a storage element may be compressed. Each salt layer forming a storage element may be in the form of a rigid block. Each salt layer forming a storage element may contain a proportion of heat conducting material in its inside, a conductive material such as expansed natural graphite or a metal powder, for example.

The storage element may be achieved in a compressed powdery salt, for example compressed beforehand or compressed upon obtaining the storage structure. Alternatively, the storage element may be achieved in a non-compressed powdery salt.

The storage element may be a rigid element, by rigid element is meant an element which essentially cannot be deformed. Alternatively, the storage element may not be a rigid element, for example a powder of a non-compressed salt or a more easily deformable element.

The compressible element for example consists of a porous material. The compressible element for example includes a porous matrix of expansed natural graphite.

The compressible element may for example include or consist of at least one layer of expansed natural graphite compressed beforehand or pre-compressed, before being set into place in the container, at an intermediate value between its free density and the density of the graphite backbone which makes it up. For example, expansed natural graphite may have a free density value of a hundred times less than the density value of the graphite backbone which makes it up.

By compression before integration into the system, it is also possible, always as an example, to dimension the graphite elements at a density of ten times less than the density of said backbone.

The compressibility level of the compressible element is for example greater than or equal to the expansion rate, in the absence of any stress, of the gas storage element between a state free of any gas and a state with gas saturation. The compressibility level of the compressible element may for example be greater than or equal to a fraction of this expansion rate. In this way, a portion of the forces resulting from the increase in the volume of the storage element are absorbed by the compressible element.

The value of the compressibility level of the compressible element may be defined according to the container into which it is intended to be integrated. Thus, a metal/storage container, typically in stainless steel, provides a significant capability of absorbing forces and a compressibility level of 50% or less than 50% may be selected. The storage container may also be made of plastic material, of composite material for example including carbon fiber.

Hybrids of these materials may also be contemplated, such as a structure with a fine base in metal reinforced by a composite material matrix. The structure may include an alternation of layers including a storage element and layers including a compressible element.

According to another example, the structure may in particular include a series of storage elements separated two by two by compressible elements.

The system may include such an organization of elements having a stack or a juxtaposition of storage elements and of compressible elements with diverse shapes.

For example, an alternation of storage element and compressible element discs may be achieved in a container for example which is axisymmetrical.

It is also possible to achieve a structure including intercalary layers having at each stage a combination of a storage element and of a compressible element.

Further, the storage structure may assume the form of a succession of absorbing elements and compressible elements of a cylindrical shape.

In the case of a stack of alternating layers, the number of intercalary layers of absorbing elements may preferentially be between 1 and 30.

The structure may be integrated to a device wherein the non-compressed powdery salt fills a space left clear by at least one compressible element forming a material structure absorbing expansion of any shape integrated to the inside of the volume of the storage container.

For a given application, the present invention allows very great design flexibility, in terms of a ratio between the mass of absorbing material and the mass of said or each compressible element, of the size, of the shape and of the density of said or each compressible element and of said or each storage element.

For a given application, the present invention also allows very great design flexibility for the material of the storage container, which may for example include a metal, plastic or a set of plastics, one or several composites, or even a hybridization of these materials.

The height of the whole of the layers in a storage material is typically included between 25% and 75% of the height of the whole of the compressible elements or layers including a compressible element, preferably between 50% and 75%, depending on the swelling of the storage material In particular, the height of each layer in a storage material is typically included between 25% and 75%, more preferentially between 50% and 75%, of the height of each compressible element or layer including a compressible element.

Such intervals are particularly adapted to the case when the storage material includes an earth-alkaline salt and when the compressible element includes expansed natural graphite, in particular in the case when the earth-alkaline salt is strontium chloride or barium chloride.

The storage structure is positioned inside a container or intended to be positioned therein.

During operation of a system including the storage structure in a container, pressurized ammonia gas is present in the container.

When the storage structure is not saturated, the grains of salt of said or each storage element absorb ammonia. It is thus possible to at least partly fill said or each gas storage layer with this ammonia.

By heating the storage element, release of the absorbed ammonia may then be obtained for extracting it from the container.

The layers in a storage material and the layers in a compressible material may have diverse shapes, in particular various shape sections.

The layers may for example have substantially the same shape as the container in which they have to be placed or are placed.

The layers may typically have a substantially cylindrical shape with a round or oval section or rounded or even rectangular or parallelepipedal.

3) Example Illustrating an Embodiment of a System with SCR Post-Treatment

Figure 1:
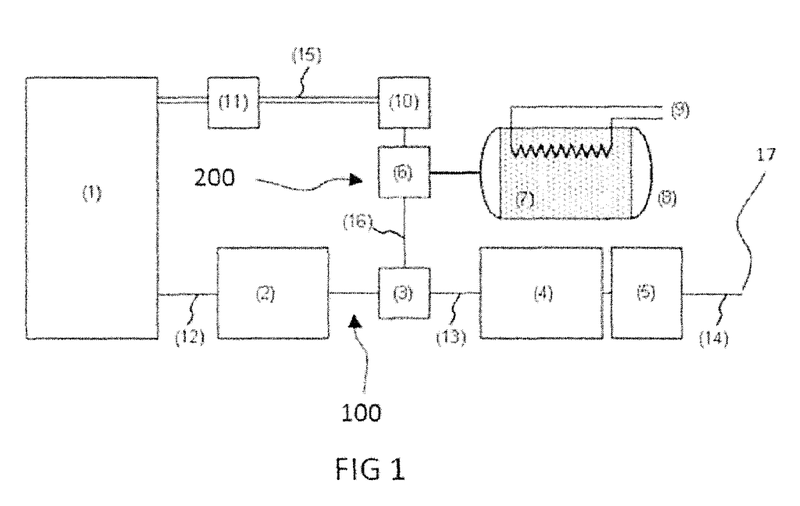
FIG. 1 illustrates a heat engine equipped with an SCR post-treatment system with ammonia injection according to an embodiment of the invention.

In FIG. 1, a heat engine is schematically illustrated, equipped with a selective catalytic reduction system for exhaust gases of an internal combustion engine, for example an SCR post-treatment system with injection of ammonia. The heat engine may be an internal combustion engine, for example a diesel engine, or a gasoline engine with a lean mixture such as a direct injection engine with a stratified mixture.

An engine 1 is driven by an electronic computer 11. At the outlet of the engine, exhaust gases 12 are directed towards a depollution system 2. The depollution system 2 may include an oxidation catalyst or a three-way catalyst. The depollution system may further include a particle filter.

Ammonia 16 is injected at an exhaust circuit 100 of the engine and mixed with the exhaust gases by means of an injection module 3 for example positioned downstream from the depollution element 2 in order to form an ammonia/exhaust gases mixture 13. The ammonia/exhaust gases mixture 13 then crosses an SCR catalyst 4 which allows reduction of $NO_x$ by ammonia. Complementary elements for post-treatment 5 may be positioned after the SCR catalyst. The complementary elements 5 may include a particle filter or an oxidation catalyst. The exhaust gases thus appear as depolluted exhaust gases 14 at the outlet of the complementary elements 5. The depolluted exhaust gases are then directed towards an exhaust outlet 17. Thus, the exhaust circuit 100 includes, positioned from the upstream, on the engine side 1, downstream on the outlet side 17, the depollution element 2, the injection module 3, the SCR catalyst 4 and the complementary elements 5.

In order to ensure supply and metering of the ammonia 16 at the inlet of the injection module 3, the system includes a storage unit including a container for storing ammonia 8 for example containing a storage structure 7 which may be driven in temperature by a heating device 9. The heating device 9 for example includes an electric resistor or a heat exchanger supplied with a heat transfer fluid such as the engine liquid coolant.

The heating device 9 for example gives the possibility of providing heat directly inside the container 8. Alternatively, the heating device 9 for example allows transmission of heat from the outside of the container 8 towards the inside of the container 8.

In particular, the heating device 9 gives the possibility of providing heat to the storage structure 7.

The storage structure 7 may include channels for transporting ammonia from the outside of the storage container 8 towards the salt layers and/or in the opposite direction.

The storage container 8 is for example connected to a pressure control device 6 for the container and a device for metering ammonia towards the injection module 3. This device 6 may be driven by a dedicated electronic controller 10 connected to the electronic computer 11 of the engine.

The system thus includes an ammonia supply circuit 200 including, from upstream to downstream in the direction of circulation of the ammonia, the storage container 8, the pressure control device 6, and the injection module 3 for injection into the exhaust 100.

In an alternative configuration (not shown), the pressure control device 6 may be directly driven by the engine computer 11.

The storage structure 7 is more specifically described in FIGS. 2*a* and 2*b*. The storage structure 7 includes at least one storage element including one powdery salt layer, for example at least one storage layer 702 in powdery salt and a second storage layer 704 in powdery salt.

Both at least provided powdery salt layers are separated from each other by at least one compressible layer, for example in a damping material, in order to orient and limit deformation of the storage structure 7 during storing and discharging of the ammonia.

By a damping material is meant a material which, in contact with a material which may expand has the property of being able to contract. Thus, the first storage layer 702 and the second storage layer 704 are separated from each other by a compressible layer 712.

The elements of the storage structure, for example formed with layers, may have symmetry of revolution of the same axis X. The structure may then have a recess along the axis of symmetry of revolution in order to allow storing and/or discharging of ammonia at each storage element.

FIG. 2*a* represents a storage structure including a successive stack of ammonia storage elements and the compressible elements before integration of ammonia. In this particular configuration, the various elements have a symmetry of revolution, constant thicknesses, they have a hole in their centre in order to let through a conduit 720 into which is inserted a heating element 730. The heating element may for example be a resistor, or a conduit inside which circulates a heat transfer fluid.

Moreover, diffusers having metal conduits pierced with holes are positioned so as to cross these storage structures, for example along an axis parallel to the X axis. The diffusers are adapted so as to bring ammonia from the outside of the storage container towards the storage material of the storage elements. The diffusers may also be used for conveying ammonia from the storage structure or a storage matrix of the storage structure towards the outside during operation of the system.

FIG. 2*b* schematically illustrates the same storage structure, after ammonia has saturated all or part of the storage material, the expansion of said or each storage element of ammonia is then observed to the detriment of said or each compressible element which is then compressed, thereby avoiding on the one hand that all or part of the consecutive force upon loading ammonia applies on the walls of the storage assembly.

Such a storage structure allows greater flexibility in the design of the storage container.

Such a storage structure gives the possibility of avoiding that the loading with ammonia leads to destruction of the macro-porosity of the storage material of said or each storage element. Macro-porosity is actually a key factor for making available or rapidly and efficiently filling ammonia during the breathing cycle of the storage structure, i.e. the cycle including the successive filling and emptying of the storage structure. It is thus possible to obtain a storage structure having a breathing matrix, retaining its integrity over time.

Figure 3A:
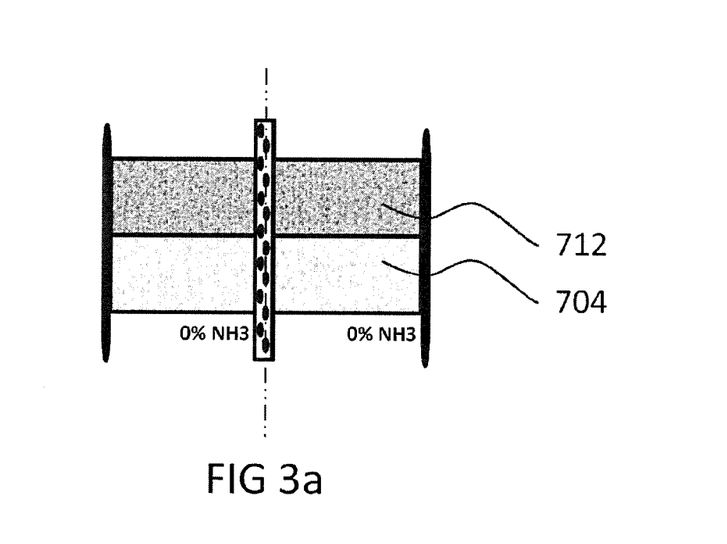
FIGS. 3a and 3b illustrate the expansion effect obtained upon loading the storage structure with a gas (for example ammonia) on compressible elements and the storage container walls.
Figure 3B:
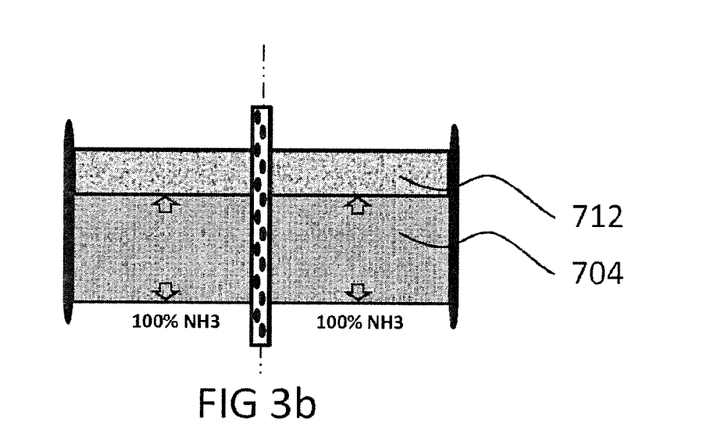

FIGS. 3*a* and 3*b* schematically illustrate a detail of the same storage structure subject to the same phenomenon so as to show the impact of the ammonia storage system on the expansion force on the wall of the storage container.

The expansion of a storage element such as the storage layer 704 thus causes compression of the compressible element such as the compressible layer 712 which absorbs a portion or the totality of the force resulting from the expansion of the storage element. It is thus possible to strongly reduce the force applied by the storage element on the side wall of the storage container. In the case of a material having a low resistance to expansion forces, it is possible to dimension the succession of elements so that the entire expansion of the storing element is absorbed by compressing the compressible elements. This situation may have the advantage of using less expensive materials, but may increase the total size of the system. It is thus possible to define a compromise between the size and the nature of the constitutive material of the storage container.

Figure 4A:
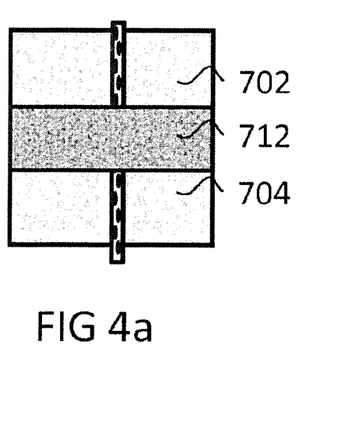
FIGS. 4a to 4c illustrate various alternatives of compressible elements.
Figure 4B:
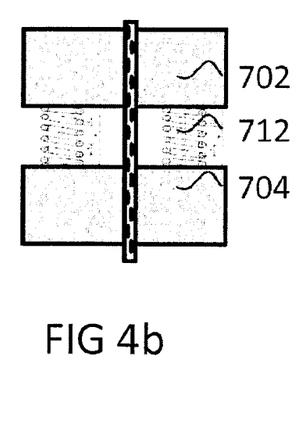
Figure 4C:
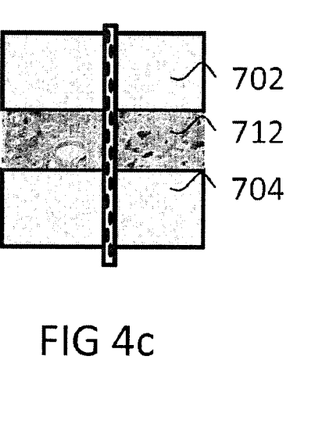

FIGS. 4a to 4c illustrate alternative philosophies of compressible elements.

FIG. 4a thus illustrates a compressible element including a layer of partly pre-compressed expansed natural graphite.

FIG. 4b illustrates a compressible element including plates, for example two plates, for example metal plates. At least one plate is maintained bearing against the compressible element. Both plates are collected and/or separated by mechanical means, for example at least one mechanical elastic element such as a spring or a plurality of springs. Such a compressible element has great simplicity in its application, and allows controlled reversibility of the expansion/compression cycles of the structure.

FIG. 4c illustrates a compressible element including foams or felts, for example in flexible materials such as for example metal flakes, nickel foams or any other material known to one skilled in the art.

Figure 5A:
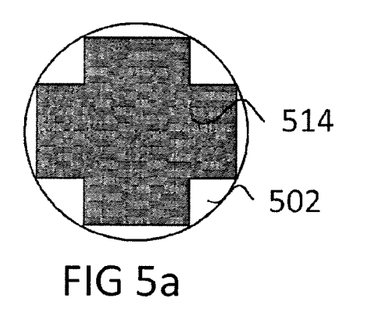
FIGS. 5a to 5c represent alternatives of associations between gas-absorbing elements and compressible elements with a damper effect.
Figure 5B:
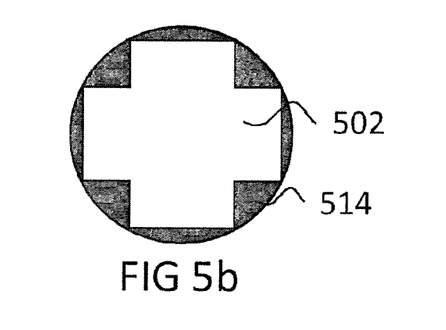
Figure 5C:
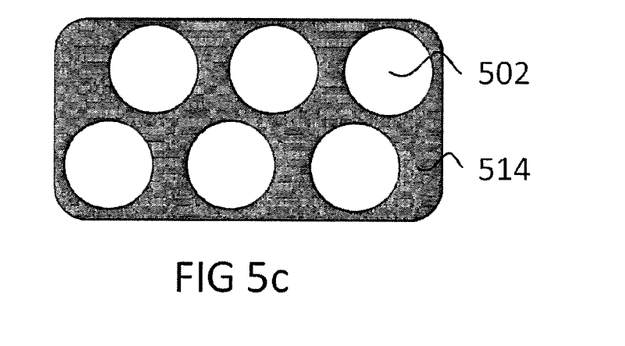

FIGS. 5a to 5c illustrate other embodiments of association between the storage element 502 and the compressible element 514.

The storage structure may include an alternation of layers including a storage element layer and at least one layer of a compressible element.

The storage structure 7 may thus include a plurality of layers of storage elements, at least one of these layers further integrating a compressible element.

The compressible element may be adapted so as to be maintained in contact with at least the storage element of the same layer, and adapted so as to deform under the action of the forces exerted by the storage element so as to limit the forces applied on the container.

The volume of the assembly of the storage elements is typically included between 25% and 75%, more preferentially for example between 50% and 75% of the volume of the assembly of compressible elements, depending on the swelling of the storage material.

In particular, for each layer in a storage material and including a compressible element, the storage element volume is typically included between 25% and 75%, more preferentially for example between 50% and 75% of the compressible element volume.

Such intervals are particularly adapted to the case when the storage material includes an earth-alkaline salt or when the compressible material includes expansed natural graphite, in particular in the case when the earth-alkaline salt is strontium chloride or barium chloride.

The storage structure may include a first combination of a storage element integrated into a compressible element so as to be surrounded by the compressible element.

The storage structure may include a second combination of a compressible element integrated into a storage element so as to be surrounded by the storage element.

The storage structure may thus include an alternation of a first combination and of a second combination, as illustrated in FIGS. 5a and 5b.

FIGS. 5a and 5b represent views of a same matrix of cylindrical shape according to two different sectional planes showing a variable distribution between the storage element 502 and the compressible element 514 according to the height. The sectional planes corresponding to both figures are for example parallel, FIG. 5a illustrating a section of a first layer with a substantially circular shape in which the compressible element 514 has a cruciform surface inside the layer, the storage element 502 occupying the peripheral area between the compressible element 512 and the circular border of the layer. FIG. 5b illustrates a section of a second layer in which the surfaces occupied by the storage element 502 and the compressible element 512 are reversed relative to the first layer.

The storage structure may include a series of storage elements integrated into a common compressible element.

Thus, FIG. 5c illustrates a storage container with a non-cylindrical shape, typically with a substantially rectangular shape, which may easily be integrated on a vehicle. The storage elements 502 for ammonia are longitudinally integrated into the storage container, inside a structure forming a compressible element 514 allowing damping of the expansion, thereby facilitating the use of a storage container with a non-cylindrical shape, in order to further reduce the sensitivity to gas over pressures or to deformations by expansion.

This common compressible element may form a layer belonging to a plurality of layers forming a storage structure according to the invention.

4) Associated Methods

First Example

An example of a method for obtaining such a gas storage structure or such a storage unit, includes the steps:
  depositing a storage element including a non-compressed or pre-compressed salt,
  depositing the element in a compressible material.

Both steps are repeated alternately in order to form a structure including a series of storage elements and of intercalary compressible layers, maintained in contact with the storage layers.

Within the scope of a method for obtaining a storage unit, these steps may be completed with one or several steps consisting of placing the elements or the structure obtained in a storage container.

The compressible elements are adapted so as to deform under the action of forces exerted by the storage elements, limiting or orienting a deformation of the storage structure, during deformations of the storage elements during phases for storing and discharging gas from said structure, so as to limit the forces applied on the container surrounding the structure.

Second Example

According to another exemplary embodiment, a method for filling a gas storage unit is described, including a container 8 intended to harbor at least one gas storage element by absorption or adsorption.

The method includes a first step consisting of placing in said container at least one gas storage element, essentially without any gas.

The method includes a second step consisting of placing in said container, adjacent to the storage element, at least one compressible element.

The method includes a third step consisting of closing the container and applying to the latter a source of pressurized gas, in order to store the gas by adsorption in said or each gas storage element, said or each compressible element being adapted so as to deform under the action of forces exerted on it because of the variations of volume of said or each storage element during the storage, so as to limit the forces applied on the container.

Third Example

According to a particular embodiment, with reference to FIGS. 6a to 6h, a method for producing the described storage structure in the container is described.

Figure 6A:
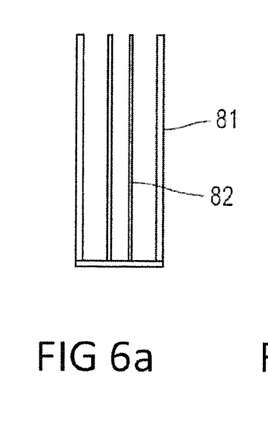
FIGS. 6a to 6h illustrate a method for producing the storage structure according to an embodiment of the invention.

In the initial state, illustrated in FIG. 6a, the container is empty.

The container for example has symmetry of revolution. The container may then include a cylindrical outer wall 81 and an inner wall forming a tube 82 delimiting a central recess extending along the axis of symmetry of the container.

With reference to FIG. 4b, the method includes a first step for depositing a first storage element, for example a first layer of non-compressed or pre-compressed powdery salt layer in the annular area located between the outer wall of the container and the wall of the tube 82.

Figures 6B, 6C:
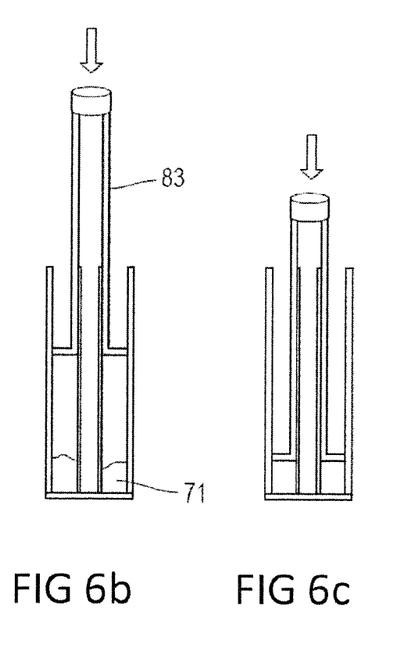

With reference to FIGS. 6b and 6c, the method may include a second step for shaping the first salt layer with a plunger 83 provided with a planar end surface and applying some pressure on the free surface of the salt layer. This second step gives the possibility of obtaining a first homogeneous salt layer and with essentially constant thickness. The first salt layer thus has symmetry of revolution of the same axis as the container.

Figure 6D:
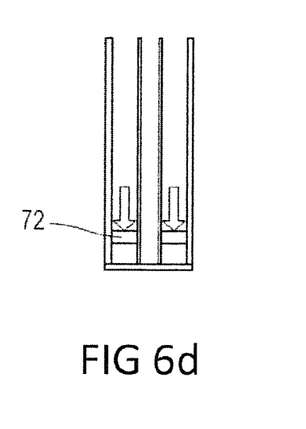

With reference to FIG. 6d, in a third step, a first compressible element 72 is deposited on the first salt layer 71. The compressible element may have the same properties of symmetry of revolution as the container.

Figures 6E, 6F:
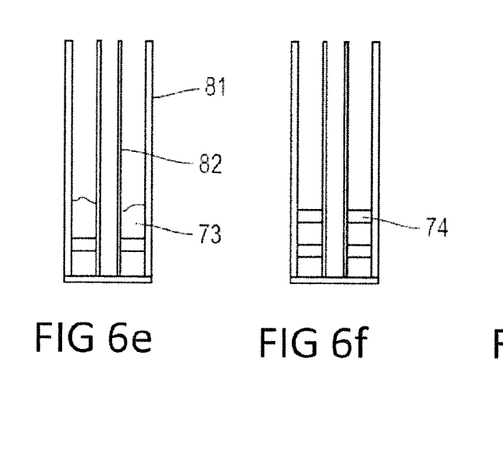

With reference to FIG. 6e, in a fourth step, a second storage element 73 is deposited on the first compressible element 72. This may be a second layer of non-compressed powdery salt.

FIG. 6f illustrates the container 8 after depositing a second layer in a compressible material 74.

Figure 6G:
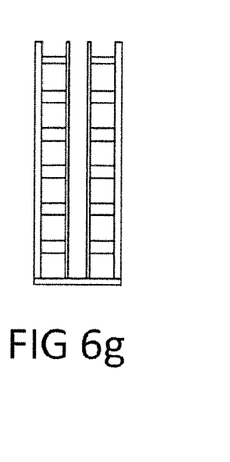

As illustrated in FIG. 6g, the first three steps of the method may be repeated up to for example 30 times in order to obtain a stratified storage structure.

It should be noted that it is possible to produce either layers of pure storage salt material or layers of mixed salt, with a given ratio, with an additive.

Fourth Example

Moreover, rigid salt wafers may be prepared in advance by compression or via the use of a binder.

It is then proceeded with implantation of the salt layers and of the compressible elements by successive stacking.

Preferentially, the storage element and the compressible element are assembled or formed in the container in order to obtain the storage structure in the absence of ammonia.

It is thus possible to obtain rigid wafers forming a layer in a storage material.

A method for producing the storage structure described in the container according to another exemplary embodiment using such rigid wafers is described here.

In the initial state, the container is empty.

The container for example has a symmetry of revolution. The container may then include a cylindrical outer wall and an inner wall forming a tube delimiting a central recess extending along the axis of symmetry of the container.

The method includes a first step for depositing a first layer of a storage material. The first layer is typically a rigid wafer of compressed powdery salt. The first layer of a storage material is typically deposited in a ring shaped area located between the outer wall of the container and the wall of the tube.

The method includes a second step for depositing a first layer of a compressible element, i.e. forming or including a compressible element on the first layer of a storage material. The compressible element is for example a stratum of expansible natural graphite.

The layer of a compressible material for example has the same properties of symmetry of revolution as the container.

The method includes a third step for depositing a second layer of a storage material, similar to that of the first step, on the first compressible element layer.

The first two steps of the method may be repeated up to 30 times in order to obtain a stratified storage structure.

Fifth Example

According to a possible alternative of the method described earlier using rigid wafers, certain of the layers may be pre-assembled out of the container.

A method for producing the storage structure described according to a third exemplary embodiment, using such rigid wafers is described here.

The method includes a first step for providing a first layer of a storage material and a first layer of compressible element.

The first layer is typically a rigid wafer of compressed powdery salt. The compressible element is for example of a stratum of expansible natural graphite.

The method includes a second step for pre-assembling the first layer of a storage material with the first layer of compressible element.

By pre-assembling is meant a typically partial assembling, achieved upstream from the layout of the container described earlier, so that the layers are secured to each other.

The layers, or given groups of layers are for example pre-assembled together by means of an adhesive. Alternatively or additionally, the layers are for example assembled together by compression of the layers against each other so that they adhere to each other and/or they interpenetrate each other in the vicinity of their interface.

The method may thus include one or several third successive steps of pre-assembling, securing one or several layers of a storage material and/or one or several compressible element layers to the pre-assembly obtained in the previous steps in order to form a pre-assembly having an alternation as described earlier.

The method may include a fourth step for producing a storage structure in a container according to one of the methods described earlier, further including a step for depositing the thereby formed pre-assembly typically out of the container, as a portion of the storage structure being formed.

By formed outside the container is meant that the pre-assembly steps were achieved out of the container.

Such pre-assembling facilitates the subsequent mounting of the storage structure in the storage container.

Moreover, such a pre-assembly allows standardization of the pre-assemblies as elements of the matrix to be mounted in order to form the structure in the container. It is thus possible to obtain storage structures with more homogeneous properties and therefore more predictable properties, which allows better control during their subsequent use. Notably, it is possible to associate with a storage salt block with a master heat conduction block, thereby optimizing the operating conditions in each of the pre-assembled groups.

The result of this is also a simplification of the logistics associated with the conveyance of the constitutive elements of the storage structure towards their assembly location.

Saturation with Ammonia

Preferentially, during the making methods, typically the making methods described earlier, said or each storage layer and said or each compressible element layer are assembled or formed in the container in order to obtain the storage structure in the absence of ammonia.

According to a preferred embodiment, the salt layers do not contain any ammonia during the steps described earlier.

The method may therefore include a step after the previous steps, in which the thereby formed storage structure is at least partly saturated with ammonia.

Preferentially, said or each storage layer and said or each compressible element layer are formed and assembled in such a way that a play subsists between said or each compressible element layer and the inner face of the wall of the container.

Figure 6H:
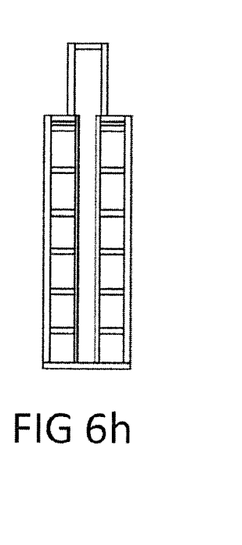

FIG. 6h illustrates a complete storage structure 7 saturated with ammonia in a closed container 8 during operation.

5) Heat Conducting Compressible Element

The compressible element may be a layer in a heat conducting material in order to increase the heat transfers within the structure.

It is thus possible to improve the transfer of heat within the storage structure.

For example, a layer including or consisting of possibly compressed, expanded natural graphite may form both a heat conducting and compressible layer.

6) Storage Structure Having Play

During a step for filling or saturating with ammonia the storage structure, the storage element, for example consisting of at least one storage layer swells and its volume increases. Such a phenomenon is for example illustrated in FIG. 4h.

The compressible element includes at least one layer in a compressible material. This layer in compressible material may be deformable. The compressible element may for example include at least one layer of compressible material made so as to be deformable. It may thus for example be formed with pre-compressed expanded natural graphite.

Thus, during filling with ammonia, said or each storage layer increases in volume and said or each layer in a compressible material is subject to forces which deform it.

The structure and the container may in particular be dimensioned so that this deformation does not involve a significant change in density of said or each layer in a compressible material, as long as a free space in the container allows a change in shape at constant density.

When a play exists between the inner wall of the container and said or each layer in a compressible material, the latter may thus deform so as to occupy a peripheral volume resulting from this play.

The compressible material layer may thus deform until it forms a contact with the inner wall of the container in the play area, for example the peripheral wall.

In a particular embodiment, the thickness of said or each layer in a compressible material may decrease and its diameter increase without any change in density, i.e. without any change in the total volume occupied by the layer.

The structure may be dimensioned so that, when all the volume of the inside of the container is occupied by the storage structure, or when no more free volume of the container is accessible to any layer of compressible material, said or each storage layer is not saturated with ammonia. Continuation of the filling of said or each storage layer implies an additional increase in volume of said or each storage layer. The volume increase is then at least partly compensated and/or the resulting forces at least partly absorbed by a compression of said or each compressible material layer, the density of which then increases.

For example, natural graphite expansed in the natural state has a density a hundred times lower than non-porous, non-expanded graphite. If said or each layer in a compressible material is formed with pre-compressed expanded natural graphite, for example in the form of a rigid wafer, said or each compressible material layer may have a density still 10 times greater than non-porous non-expanded graphite. Its theoretical compression capacity is therefore a factor 10.

Thus, the storage structure may be made so that the different layers are maintained in contact even when the storage structure is not saturated, or even when the storage structure is almost empty of ammonia. Moreover the fact that the elements of the storage structure are maintained avoids their displacement and their wear in an anticipated way by friction or mechanical impacts.

Such a storage structure has the advantage of nevertheless limiting the forces to which the container is subject, inside which the storage structure is positioned. Indeed, the resulting forces from the increase of the volume of said or each storage layer is absorbed by said or each compressible material layer which changes shape at constant density while play space may be occupied, and then which is compressed and for which the density increases then when all the accessible play space is occupied.

According to an exemplary embodiment, the layers of the storage structure may be formed by a stack of discs, of wafers, in alternation. The container may be of a general cylindrical or conical shape or having any section, for example a square or oval section. The container may have a general shape pierced right through along a given axis. In the case of a conical container or of a shape with a variable section, the wafers have diameters of variable dimensions.

In such an exemplary structure having a stack of discs, the structure may have an alternation of at least one disc forming a storage layer and of at least one disc forming a layer of a compressible material. The disc may be provided so that the thickness of the empty storage layer is at least twice as thick as an adjacent empty compressible material layer.

Further, the discs may be provided so that the play between the edge of the compressible material layer and the inner wall of the container which contains the storage structure, i.e. the space right through the layer, is included between 2% and 30%, more preferentially for example between 5% and 16%, of the transverse diameter of the layer (or the equivalent main length in the case of a structure with a particular contour) when the storage structure is empty of ammonia.

In such play ranges, it is thus possible to further limit the forces applied to the container, the compressible material layer only substantially compressing in thickness after the relevant play has been filled by expansion outwards, while maintaining the layers of the storage structure in contact with its neighbors.

7) Example of a Method for Obtaining a Storage Structure Having Play

According to a first step, layers of compressible material are provided. A preliminary step for compression to given dimensions, in particular to a given thickness and/or to a given section, may give the possibility of providing such layers at a desired density.

According to a second step, storage material layers are provided. These layers may be prepared by compression of a powder including a powdery salt as described earlier. This compression may be achieved so as to obtain layers with given dimensions, in particular with a given thickness and/or with a given section.

According to a third step, the storage material layers and the compressible material layers are placed in the container so as to form the storage structure as a stack having an alternation of these layers. Alternatively, the layers may be stacked alternately outside the container, the layers adhering to each other in order to form one or several self-supporting secured assemblies. This (these) assembly(ies) are then placed inside the container.

Figure 7:
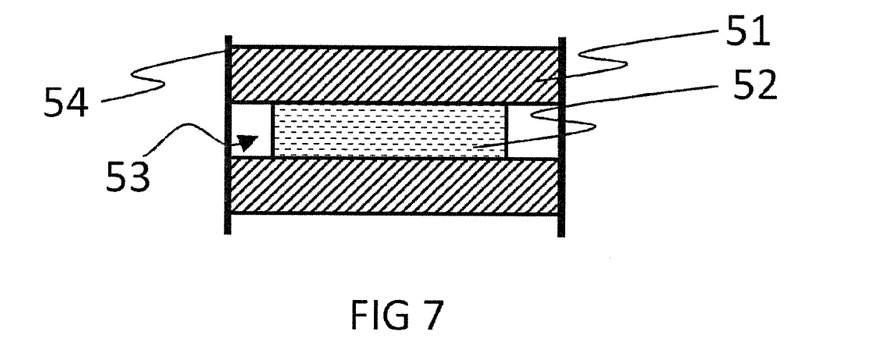
FIG. 7 illustrates a portion of a storage unit having play; and table 1 illustrates the theoretical expansion ratio of ammoniacate complexes.

With reference to FIG. 7, a portion of a storage structure is described, in which each compressible material layer 52 is dimensioned relative to the container so as to have a play 53 between said layer and the wall 54 of the container when the structure is not saturated with ammonia, so that an increase in the volume of an adjacent storage layer 51 during filling with ammonia is compensated in an initial filling phase by modifying the shape of the compressible material layer 52 for occupying the free space resulting from the play. Next, the compressible material layer 52 may if necessary be compressed in order to absorb the continuation of the increase in volume. The compressible material layer, in intimate contact both with the wall of the container and with the storage material layer ensures excellent heat transfer.

Of course, the present invention is by no means limited to the described and illustrated embodiments, and one skilled in the art will know how to combine them and provide them with many alternatives and modifications with his/her general knowledge.

The invention claimed is:

1. A storage unit for storing gas by absorption or adsorption comprising:
   a container including a gas storage element;
   a compressible element disposed within the container and maintained in contact with the gas storage element, the compressible element adapted to deform under an action of forces exerted by the gas storage element during volume variations of the gas storage element during phases for storing and discharging gas, so as to limit forces applied on the container by said compressible element by compressing in a direction corresponding to a direction of said action of forces;
   an alternation of layers including a layer of the gas storage element and at least one layer of the compressible element;
   wherein each layer of the gas storage element forms a rigid wafer or disc, and
   wherein the compressible element includes a metal plate.

2. The storage unit according to claim 1, wherein the gas storage element is in a compressed powdery form.

3. The storage unit according to claim 1, wherein the compressible element comprises a porous medium.

4. The storage unit according to claim 1, including a series of gas storage elements separated one from the other with compressible elements.

5. The storage unit according to claim 1, including a first combination of the gas storage element, integrated into the compressible element so as to be surrounded by the compressible element.

6. The storage unit according to claim 5, including a second combination of the compressible element integrated into the gas storage element so as to be surrounded by the gas storage element.

7. The storage unit according to claim 6, including an alternation of first combination(s) and of second combination(s).

8. The storage unit according to claim 1, wherein the compressible element includes two portions, at least one portion being maintained bearing against the gas storage element, both portions being interconnected through an elastic mechanical element.

9. The storage unit according to claim 8, wherein the elastic mechanical element includes a spring.

10. A selective catalytic reduction system for exhaust gases of an internal combustion engine, wherein the system includes a storage unit for storing gas according to claim 1 and a module for injecting gas into the exhaust gases.

11. The storage unit according to claim 1, wherein the alternation of layers forms a stack of wafers or discs.

12. The storage unit according to claim 1, wherein during filling with gas, each gas storage element layer increases in volume and each layer of the compressible element is subject to forces which deform each layer of the compressible element.

13. The storage unit according to claim 1, wherein a play exists between an inner wall of the container and each layer of the compressible element so that each layer of the compressible element may thus deform so as to occupy a peripheral volume resulting from the play.

14. The storage unit according to claim 13, wherein the at least one layer of the compressible element may thus deform until the at least one layer of the compressible element forms a contact with the inner wall of the container in a play area.

15. The storage unit according to claim 13, wherein a thickness of each layer of the compressible element may decrease and a diameter of each layer of the compressible element increases without any change in density.

16. The storage unit according to claim 13, wherein the play between an edge of at least one layer of the compressible element and the inner wall of the container, is between 2% and 30%, of a transverse diameter of the at least one layer of the compressible element when the gas storage element is empty.

17. The storage unit according to claim 13, wherein the play between an edge of at least one layer of the compressible element and the inner wall of the container, is between 5% and 16%, of a transverse diameter of the at least one layer of the compressible element when the gas storage element is empty.

18. The storage unit according to claim 12, wherein the compressible element includes a second metal plate.

19. The storage unit according to claim 12, wherein the storage unit is dimensioned so that said deformation does not cause a change in density of the compressible element, as long as a free space in the container allows a change in shape of the compressible element at constant density.

20. A storage unit for storing gas by absorption or adsorption comprising:
a container including a gas storage element;
a compressible element disposed within the container and maintained in contact with the gas storage element, the compressible element adapted to deform under an action of forces exerted by the gas storage element during volume variations of the gas storage element during phases for storing and discharging gas, so as to limit forces applied on the container by said compressible element by compressing in a direction corresponding to a direction of said action of forces;
an alternation of layers including a layer of the gas storage element and at least one layer of the compressible element;
wherein each layer of the gas storage element forms a rigid wafer or disc,
wherein the compressible element includes a porous matrix of expanded natural graphite.

21. The storage unit according to claim 20, wherein expanded natural graphite of the porous matrix is pre-compressed before being set into place in the container.

22. A structure for storing gas by absorption or adsorption, adapted so as to be positioned in a container, the structure including a gas storage element for storing gas by absorption or adsorption, wherein the structure further includes a compressible element maintained in contact with the gas storage element and adapted so as to deform under an action of forces exerted by the gas storage element during volume variations of the gas storage element during phases for storing and discharging gas, said compression element compressing in a direction corresponding to a direction of said action of forces;
an alternation of layers including a layer of the gas storage element and at least one layer of the compressible element;
wherein each layer of the gas storage element forms a rigid wafer or disc, and
wherein the compressible element includes a metal plate.

23. A method for filling a gas storage unit including a container including at least one gas storage element and at least one compressible element which includes a metal plate, wherein the method includes the following steps:
placing in said container the at least one gas storage element, essentially without any gas,
placing into said container, adjacent to the at least one gas storage element, the at least one compressible element, wherein the at least one compressible element is adapted to deform under an action of forces exerted by the at least one gas storage element during volume variations of the at least one gas storage element during phases for storing and discharging gas, so as to limit forces applied on the container by said at least one compressible element compressing in a direction corresponding to a direction of said action of forces,
closing the container and applying to the container a source of pressurized gas, in order to store the gas by adsorption in each of the at least one gas storage elements, the at least one compressible element being adapted so as to deform under the action of forces exerted thereon because of volume variations of the at least one gas storage element during storing of the gas, so as to limit forces applied on the container;
forming an alternation of layers including a layer of the least one gas storage element and at least one layer of the at least one compressible element, wherein each layer of the at least one gas storage element forms a rigid wafer or disc.

24. The method according to claim 23, wherein the at least one gas storage element is a layer of powdery salt, the method including introducing the powdery salt into the container so as to form a layer and shaping of said layer by a plunger.

25. A method for obtaining a structure for storing gas by absorption or adsorption, said structure including a container including a gas storage element, wherein the storage unit further includes a compressible element which includes a metal plate adapted to deform under an action of forces exerted by the storage element during volume variations of the gas storage element during phases for storing and discharging gas by said compressible element compressing in a direction corresponding to a direction of said action of forces, the method including the steps:
depositing a gas storage element layer including a non-compressed or pre-compressed salt,
depositing a layer of said compressible element,
both steps of depositing being repeated so as to form a structure including an alternation of gas storage element layers and at least one intercalary compressible element layer,
wherein the gas storage element layer and the compressible element layer are pre-assembled, both layers then being deposited in the container simultaneously;
wherein each layer of the gas storage element forms a rigid wafer or disc.

26. The method according to claim 25, wherein pre-assembling is achieved by adhesive bonding and/or compressing the gas storage element layer and the layer of the compressible element against each other.

27. A storage unit for storing gas by absorption or adsorption comprising:
a container including a gas storage element;
a compressible element disposed within the container and maintained in contact with the gas storage element, the compressible element adapted to deform under an action of forces exerted by the gas storage element during volume variations of the gas storage element during phases for storing and discharging gas so as to limit forces applied on the container by said compressible element by compressing in a direction corresponding to a direction of said action of forces;
air alternation of layers including a layer of the gas storage element and at least one layer of the compressible element;
wherein each layer of the gas storage element forms a rigid wafer or disc,
wherein a height of a whole of the layers of the gas storage element is between 25% and 75% of a height of a whole of the at least one layer of the compressible element.

28. The storage unit according to claim 27, wherein a height of a whole of the layers of the gas storage element is between 50% and 75% of a height of a whole of the at least one layer of the compressible element.

29. The storage unit according to claim 27, wherein a height of each layer of the gas storage element is between 25% and 75% of a height of each of the at least one layer of the compressible element.

30. The storage unit according to claim 29, wherein a height of each layer of the gas storage element is between 50% and 75% of a height of each of the at least one layer of the compressible element.

31. A storage unit for storing gas by absorption or adsorption comprising:
- a container including a gas storage element;
- a compressible element disposed within the container and maintained in contact with the gas storage element, the compressible element adapted to deform under an action of forces exerted by the gas storage element during volume variations of the gas storage element during phases for storing and discharging gas, so as to limit forces applied on the container by said compressible element by compressing in a direction corresponding to a direction of said action of forces;
- an alternation of layers including a layer of the gas storage element and at least one layer of the compressible element;

wherein each layer of the gas storage element forms a rigid wafer or disc,
wherein a volume of an assembly of gas storage elements is between 25% and 75% of a volume of an assembly of compressible elements.

32. The storage unit according to claim 31, wherein a volume of an assembly of gas storage elements is between 50% and 75% of a volume of an assembly of compressible elements.

33. A storage unit for storing gas by absorption or adsorption comprising:
- a container including a gas storage element;
- a compressible element disposed within the container and maintained in contact with the gas storage element, the compressible element adapted to deform under an action of forces exerted by the gas storage element during volume variations of the gas storage element during phases for storing and discharging gas, so as to limit forces applied on the container by said compressible element by compressing in a direction corresponding to a direction of said action of forces;
- an alternation of layers including a layer of the gas storage element and at least one layer of the compressible element;

wherein each layer of the gas storage element forms a rigid wafer or disc,
wherein for each layer of the gas storage element and the at least one layer of the compressible element, a gas storage element volume is between 25% and 75% of a compressible element volume.

34. The storage unit according to claim 33, wherein for each layer of the gas storage element and the at least one layer of the compressible element, a gas storage element volume is between 50% and 75% of a compressible element volume.

* * * * *